United States Patent [19]

Shaw

[11] Patent Number: 5,503,108
[45] Date of Patent: Apr. 2, 1996

[54] SUSPENSION SYSTEM FOR BIRD FEEDERS AND THE LIKE

[75] Inventor: Donald J. Shaw, Charlotte, N.C.

[73] Assignee: D & C Shaw Enterprises, Inc., Charlotte, N.C.

[21] Appl. No.: 252,593

[22] Filed: Jun. 1, 1994

[51] Int. Cl.⁶ .................................................. A01K 39/00
[52] U.S. Cl. ............................................................ 119/57.8
[58] Field of Search ................. 119/57.8, 23, 52.1–52.4, 119/57.9

[56] References Cited

U.S. PATENT DOCUMENTS

| 2,252,001 | 8/1941 | Gullberg | 254/390 |
| 3,367,632 | 2/1968 | Vail | 119/23 |
| 4,447,043 | 5/1984 | Bocchiaro | 254/390 X |
| 4,702,198 | 10/1987 | Holyoak | 119/23 |
| 4,767,099 | 8/1988 | Munks | 254/336 |

Primary Examiner—Thomas Price
Attorney, Agent, or Firm—Bell, Seltzer, Park & Gibson

[57] ABSTRACT

A suspension system for a bird feeder or the like includes a flexible line or cable of predetermined length, a swivel connector at one end for attachment to a bird feeder or the like and an anchor at the other end thereof, and a pair of support devices for supporting the flexible cable at spaced locations, the support devices each including a pulley, a hook adapted to be placed over a tree limb and a socket for releasable receipt of an end of a pole by which the support devices may be hoisted to an overhead tree limb without the use of a ladder.

9 Claims, 2 Drawing Sheets

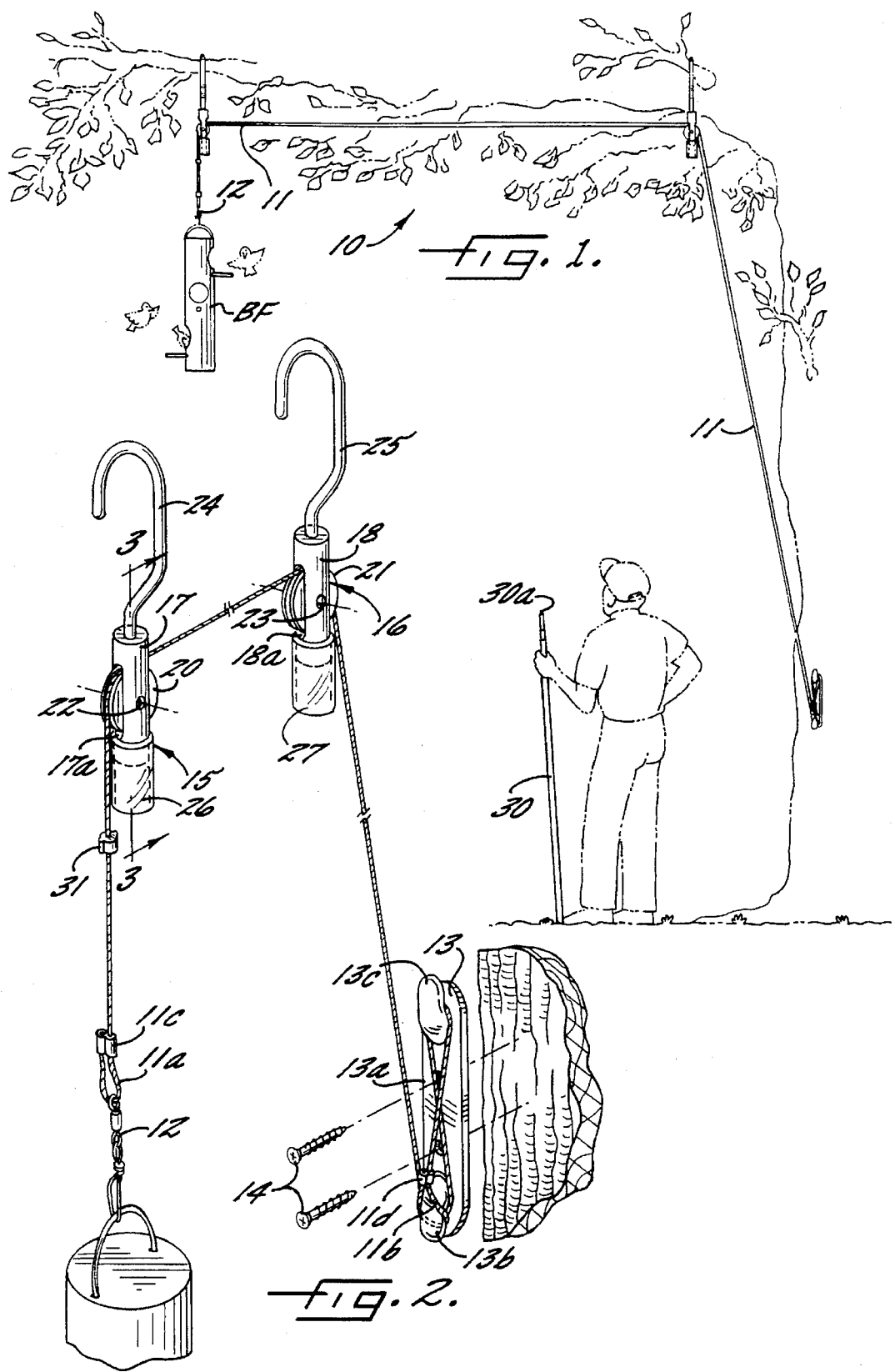

SUSPENSION SYSTEM FOR BIRD FEEDERS AND THE LIKE

FIELD OF THE INVENTION

This invention relates to suspension systems for suspending an object, such as a bird feeder, flower basket or the like, requiring frequent attention or maintenance, at a substantial height above the ground.

BACKGROUND OF THE INVENTION

It is usually desirable to locate bird feeders and other similar objects from tree limbs or other supports at a height above the ground which cannot be reached except by use of a ladder. Since such objects require frequent attention, such as replenishing the supply of bird feed, it becomes a nuisance to have to use a ladder each time the object needs attention.

It is frequently desirable to locate such objects at a considerable height above the ground as when one wishes it to be visible from second story windows, decks and the like. In such instances, the use of a ladder can be dangerous.

SUMMARY OF THE INVENTION

Accordingly, it is an object of the present invention to provide a suspension system for such objects which can be initially installed in a tree or other supporting structure up to a considerable height above the ground without the use of a ladder and which permits the object to be lowered to ground level for servicing and then raised back to the desired use location.

The foregoing object is accomplished by providing a suspension system including a flexible line or cable having a connector at one end adapted to be connected to the object to be supported, such as a bird feeder, and an anchor adapted to be mounted on a tree trunk or the like and to which the other end of the line or cable is to be attached. The suspension system further includes at least one support device for the line or cable including a rotatable pulley, a hook adapted to be placed over a tree limb or the like for supporting the pulley and the line or cable, and an open-ended socket for releasably receiving the end of a pole or other extension device for placement of the support device on a tree limb or the like at a considerable height without the necessity of using a ladder.

BRIEF DESCRIPTION OF THE DRAWINGS

Some of the objects and advantages of the present invention having been stated, others will appear as the description proceeds when considered in conjunction with the accompanying schematic drawings, in which:

FIG. 1 is a elevation view of the suspension system of the present invention;

FIG. 2 is an enlarged perspective view of the suspension system shown in FIG. 1 with portions broken away;

DETAILED DESCRIPTION OF THE PREFERRED EMBODIMENT

Figures 3, 4:
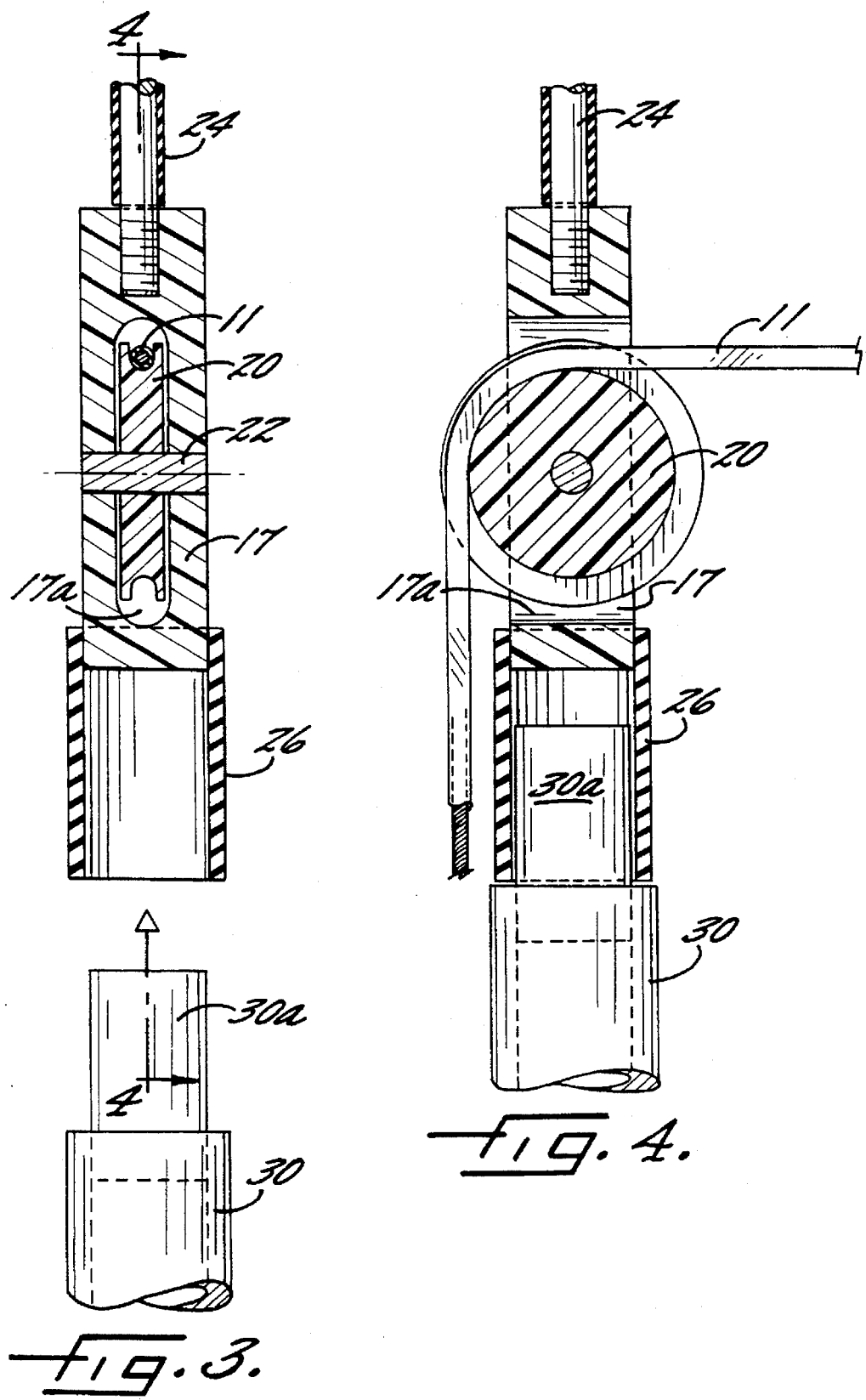
FIG. 3 is an enlarged, fragmentary sectional view taken substantially along line 3—3 in FIG. 2.
FIG. 4 is a fragmentary sectional view taken substantially along line 4—4 in FIG. 3.

Referring now more particularly to the drawings, a suspension system, generally indicated at 10, for a bird feeder BF is illustrated. Suspension system 10 includes a flexible line or cable 11 formed of any suitable material that will not unduly deteriorate in the outdoors. A suitable line or cable 11 is aluminum or galvanized steel wire cable available in most hardware stores.

Cable 11 is of a suitable length to permit the bird feeder BF to be supported at any desired height above the ground. Opposite ends of the cable 11 are formed into loops 11a, 11b with the free ends thereof being secured by copper clamps 11c, 11d, respectively. A swivel connector 12 is mounted in loop 11a at one end of cable 11 for connecting cable 11 to the bird feeder BF. Swivel connector 12 may be of any suitable construction, such as those swivels available in any fishing tackle store. The bird feeder BF may thus turn in the breeze without twisting the cable 11.

An anchor 13 adapted to be mounted on a tree trunk or the like by screws 14 is provided. Anchor 13 has a base plate 13a and oppositely facing hook portions 13b, 13c on base plate 13a. The cable 11 is adapted to be wound about the hook portions 13b, 13c and to have the loop 11b placed over one of the hook portions 13b, 13c, such as hook portion 13b as shown in FIG. 2, to anchor the end of cable 11 opposite the bird feeder BF.

A pair of support devices 15 and 16 support the cable 11 intermediate the ends thereof. Support devices 15, 16, each include a body portion 17, 18 formed of a hard, moldable plastic, such as high molecular weight polyethylene. Body portions 17, 18 have elongate openings 17a, 18a extending laterally therethrough. Pulleys 20, 21, also molded of hard, durable plastic, are mounted in openings 17a, 18a, respectively, by non-corrodible shafts 22, 23. Shafts 22, 23 are preferably made of brass and force-fitted in aligned holes in body portions 17, 18. The cable 11 extends through openings 17a, 18a and extends partially around the periphery of pulleys 20, 21.

Support devices 15, 16 also each include a hook 24, 25 mounted on the top of body portions 17, 18 and extending upwardly therefrom. Hooks 24, 25 may be formed of plastic, but preferably are formed of plastic coated metal. Hooks 24, 25 are adapted to be placed over a tree limb or limbs at spaced apart locations.

Sockets 26, 27 are mounted on the bottom of body portions 17, 18 and are adapted to receive the end 30a of a pole 30 or other extension device to permit the support devices 15, 16 to be placed at a considerable height above the ground without the necessity of using a ladder. Sockets 26, 27 are preferably formed of flexible plastic tubing which may be cut to any desired length. One end of sockets 26, 27 is connected to the body portions 17, 18, preferably by a suitable adhesive.

A stop 31 is preferably mounted on the cable 11 between the end loop 11a and the pulley 20 to limit the movement of cable 11 through the support device 15. Stop 31 fits tightly on the cable 11, but may be slidable along cable 11 to vary the minimum distance that the bird feeder BF is supported from the support device 15.

In use, a bird feeder BF or the like is attached to cable 11 by the swivel connector 12. The pole 30 is connected to support device 15 by having the end 30a thereof inserted in socket 26. By pole 30, support device 15 is hoisted overhead to a tree limb above the level at which the bird feeder BF is desired to be suspended and at a predetermined distance from the tree trunk. Once the hook 24 is placed over the tree limb, the pole 30 is removed by withdrawing end 30a thereof from socket 26.

Then, support device 16 is hoisted in a similar manner to the same or a different tree limb over which hook 25 is placed. Preferably, support device 16 is placed near the tree trunk so that the section of cable 11 between the support device 16 and the anchor 13 is substantially vertical and as close as possible to the tree trunk to reduce to a minimum the danger of a bird flying into the cable 11. The end portion of cable 11 including end loop 11*b* is wound about the anchor 13 once the bird feeder BF is raised to the desired location.

When the bird feeder BF needs attention, such as when bird feed needs to be added, the anchored end portion is removed from anchor 13 and the bird feeder BF is lowered to ground level. Once attended to, the bird feeder BF is again raised to the desired level and the end portion of cable 11 is again anchored.

The bird feeder BF and the suspension system 10 may be removed by reversing the foregoing installation procedure.

In the drawings and specifications, there has been set forth a preferred embodiment of the invention, and although specific terms are employed, they are used in a generic and descriptive sense only and not for purposes of limitation.

That which is claimed is:

1. A suspension system adapted to support bird feeders and the like from tree limbs or other overhead supports at a substantial height above the ground without the use of a ladder, said suspension system comprising flexible means of a predetermined length to reach a substantial height and to return to ground level, said flexible means being adapted to be connected to a bird feeder or the like at one end thereof and to be releasably anchored to a tree or the like at the other end thereof, and support means having a rotatable pulley about which said flexible means is entrained and including hook means adapted to be place over a tree limb or other horizontal support for supporting said support means and flexible means therefrom, said support means further comprising socket means for releasable receipt and free disengagement of one end of a pole for placement of said hook means over a tree limb or the like or for removal of said hook means therefrom.

2. A suspension system according to claim 1 including swivel means for rotatable connection to said one end of said flexible means, and being adapted to connect said flexible means to a bird feeder or the like.

3. A suspension system according to claim 1 including anchor means adapted to be mounted on a tree trunk or the like for releasably anchoring the other end of said flexible means.

4. A suspension system according to claim 1 wherein said flexible means comprises a wire cable.

5. A suspension system according to claim 1 wherein said support means comprises a body portion, a pulley rotatably mounted on said body portion, a hook mounted on the top of said body portion and extending upwardly therefrom, and a socket mounted on the bottom of said body portion and extending downwardly therefrom and terminating in an open bottom end, said socket being adapted to receive releasably the end of a pole by which the support means may be hoisted into position.

6. A suspension system according to claim 1 including second support means spaced from said first support means along said flexible means for supporting flexible means at spaced locations on a tree limb or limbs.

7. A suspension system for bird feeders or the like comprising a flexible, non-corrosive cable of predetermined length adapted to be connected to a bird feeder or the like at one end thereof, and first and second support means for supporting said cable from an overhead tree limb or limbs at spaced apart locations, each of said support means comprising an elongate body portion having an elongate opening transversely therethrough, a pulley rotatably mounted in said opening, a hook mounted on the top of said body portion and adapted to placed over a tree limb, and a socket mounted on said body portion and having an open end adapted to receive releasably and freely disengage the end of a pole for hoisting of said support means to an overhead tree limb without the necessity of a ladder.

8. A suspension system according to claim 7 wherein said body portion and said pulley of each of said support means are molded of a hard, durable plastic and said sockets are formed from flexible plastic tubing.

9. A suspension system according to claim 8 wherein said hooks are formed of plastic coated metal.

* * * * *